United States Patent [19]
Streutker

[11] 3,866,719
[45] Feb. 18, 1975

[54] REMOTELY CONTROLLED BRAKE SYSTEM

[76] Inventor: John F. Streutker, Route 4, Box 553, Port Orchard, Wash. 98366

[22] Filed: Feb. 22, 1973

[21] Appl. No.: 334,862

[52] U.S. Cl. ............................. 188/3 R, 188/106 R
[51] Int. Cl. .......................................... B60t 13/24
[58] Field of Search .......... 188/106 R, 106 P, 112, 188/3 R, 3 H, 156, 162, 163

[56] References Cited
UNITED STATES PATENTS

| | | | |
|---|---|---|---|
| 2,711,228 | 6/1955 | Shank | 188/3 R |
| 3,000,476 | 9/1961 | Barry | 188/162 X |
| 3,204,725 | 9/1965 | McGraw | 188/3 R |

*Primary Examiner*—Duane A. Reger
*Attorney, Agent, or Firm*—Seed, Berry, Vernon & Baynham

[57] ABSTRACT

A towed vehicle is provided with a brake pedal actuator that is releasably supported against the seat, floor and a rigid part of the towed vehicle above the floor. The actuator may be installed or removed from the towed vehicle quickly and without tools. The actuator is powered by a pneumatic supply and control provided in the towing vehicle.

7 Claims, 5 Drawing Figures

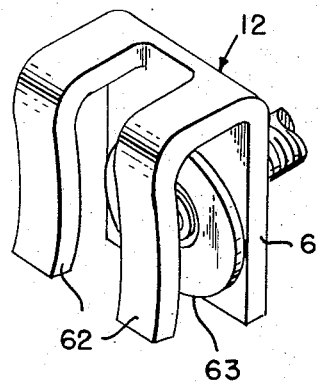
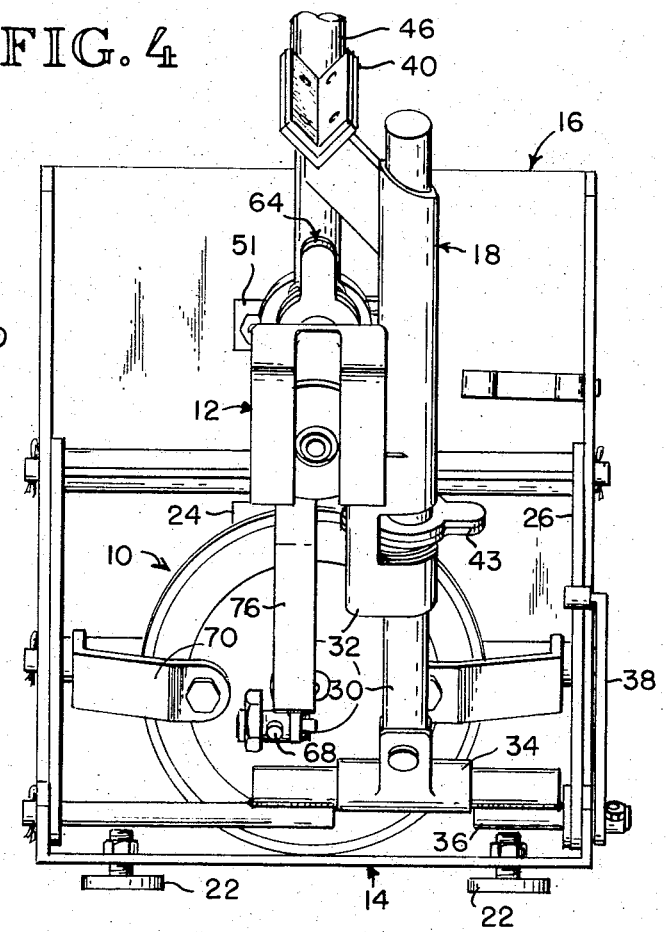
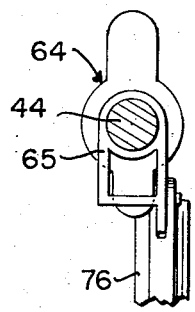
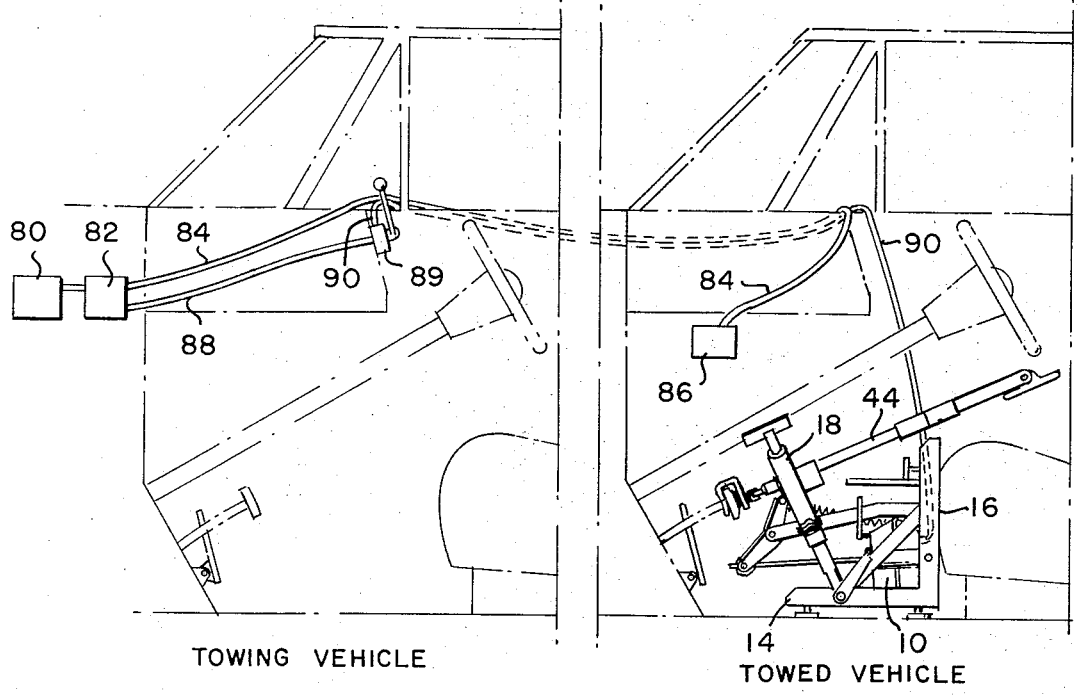

REMOTELY CONTROLLED BRAKE SYSTEM

BACKGROUND OF THE INVENTION

1. Field of the Invention

This invention pertains to remotely controlled braking systems of the type adapted to depress the brake pedal on the towed vehicle.

2. Description of the Prior Art

It is a common requirement for a towed vehicle, such as a car or truck, to have an independent braking system controlled from the towing vehicle. Heretofore, the braking systems available for this purpose have been custom designed for certain types of vehicles or have been integrally manufactured into the towed vehicle at the time of manufacture. Since towing companies are frequently required to tow every known make and model of truck and automobile the companies have not accepted the available braking systems due to the lack of universal application.

Two known systems are disclosed in U.S. Pat. Nos. 3,204,725 and 2,207,228. These patents disclose braking systems requiring a support mechanism which clamps directly on the steering column and thus cannot be used on vehicles in which the steering column is completely enclosed. Furthermore, each employs a clamping device requiring tools to secure the device to the steering column. The operation of the towing truck in some areas of the country exceeds 20.00 dollars per hour. If the operator must have available and use tools to secure the braking device, the time involved makes the service to expensive.

SUMMARY OF THE INVENTION

It is an object of this invention to provide a remotely controlled braking system which is easily and quickly installed in the towed vehicle.

It is another object of this invention to provide a remotely controlled brake pedal actuating system that has universal application for virtually all known makes of cars and trucks.

It is still another object of this invention to provide an easily installed brake pedal actuating system which employs a quick-disconnect pneumatic coupling with the towing vehicle.

Basically, these objects are accomplished by providing a brake pedal actuator, means removably coupling the brake actuator to the foot brake operating mechanism of the towed vehicle and bracing the actuator in the vehicle, the bracing means including a three point support from the floor, the seat and a rigid part of the frame above the floor. Although an electrical connection can be made between the brake actuator in the towed vehicles and the controls in the towing vehicle, in the preferred form of this invention a unique pneumatic system is employed.

DESCRIPTION OF THE DRAWINGS

FIG. 2 is a fragmentary isometric of a portion of the actuator shown in FIG. 1.

FIG. 3 is a fragmentary section of a portion of the actuator shown in FIG. 1 taken along the line 3—3 of FIG. 1.

FIG. 4 is a front elevation of the braking device shown in working condition.

FIG. 5 is a schematic operational diagram illustrating the pneumatic circuit employed with the actuator.

DETAILED DESCRIPTION OF THE PREFERRED EMBODIMENTS

Figure 1:
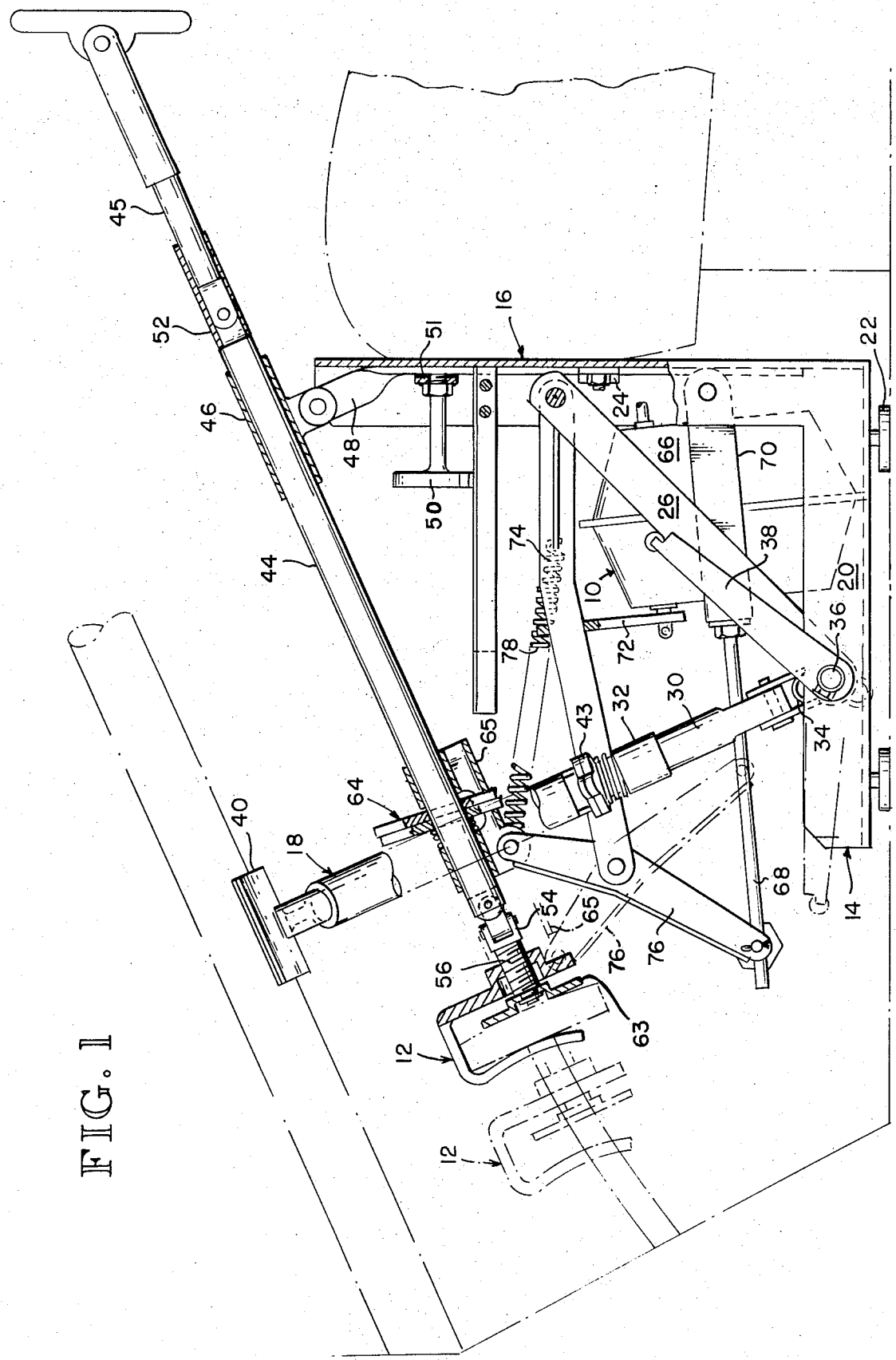
FIG. 1 is a side elevation, with parts broken away for clarity, illustrating a brake actuator and coupling means in a towed vehicle.

As best shown in FIG. 1 the remotely controlled brake system employs a brake actuator 10, a pedal clamp 12, brace means 14 for supporting the actuator on the floor of the vehicle, second brace means 16 for supporting the actuator against the seat S of the vehicle, and third brace means 18 for supporting the actuator against upward movement and engageable with a rigid portion of the vehicle above the floor. Energization of the actuator 10 powers the clamp 12 forwardly to depress the brake pedal while the three brace means rigidly hold the actuator against the reaction force of the pedal.

Brace means 14 comprises a flanged plate 20 supported on the floor by vertically adjustable feet 22. The plate 20 is integrally connected to a similar flanged vertical plate 24 and strengthened by a pair of transversely spaced angle supports 26.

The brace 18 comprises a locking bar 30 on which is telescopically mounted a locking ram 32. The locking bar is connected at its lower end to an eccentric shaft 34. The shaft is welded to a pair of stub shafts 36 having centerlines eccentric to the center line of the shaft 36. The stub shafts are journaled in a flange of the plate 20 and one is coupled to a handle 38. By pivoting the handle from the phantom line position to the solid line position the shaft 36 is elevated, moving the locking bar 30 away from the plate 20.

The locking ram 32 terminates in a pad 40 which is engagable with the steering column, a rigid part of the underside of the dashboard panel, or any other rigid member readily available above the floor of the vehicle. In the preferred embodiment the pad is used principally with a steering column but it is of course understood that the design of the vehicle will determine how the pad will be used. The pad is initially positioned quickly against the steering column by a conventional friction lock mechanism of the type well known to one skilled in the art. It is sufficient to explain that the locking mechanism includes plates 43 which when aligned on the bar 30 allow lengthwise movement of the ram relative to the bar, but when canted on the bar hold the ram rigidly on the locking bar. Once initially positioned, the handle 38 is pivoted providing an additional ¾ inch throw to firmly lock the pad in place.

The brake pedal actuator 10 includes a guide bar 44 slidably mounted in a vertically adjustable sleeve 46. The sleeve 46 is pivotally mounted to a plate 48 which is held in any desired vertical position relative to the plate 24 by a locking screw 50 threadably secured in a bracket 51. The bar 44 is provided with an extension 45 which can be swung into the position shown and held in place with a sleeve coupling 52. The lower end of the bar 44 is connected by a universal connection 54 to the clamp 12 via a threaded shaft 56.

The clamp 12 includes a rigid plate 60 having a pair of fingers 62 that are spaced from the main body of the plate and a movable plate 63. The clamp can be rotated so that the fingers and main body of the plate can be slid over any known type of brake pedal either from the side, above or below. The clamp is tightened on the pedal by rotating bar 44 to screw plate 63 toward fingers 62.

The guide bar 44 is also provided with a conventional friction locking device 64 identical to that used with the ram 32 for locking the bar relative to a sleeve 65 in any desired position. The actuator 10 further comprises a vacuum cylinder or piston-type ram 66 having a piston rod 68. The cylinder is held on the vertical plate 24 by a strap 70. The cylinder is supported from above by a plate 72 which is coupled to a post 74. The outer end of the post 74 pivotally mounts a lever 76 at approximately its mid point. The lower end of the lever is pivotally mounted to the piston rod 68, whereas the upper end is pivotally mounted to the sleeve 65. Reciprocation of the piston rod 68 will cause the lever arm to pivot about the outer end of the post 74 moving the guide bar 44 in the sleeve 46 and depressing the brake pedal P. A spring 78 returns the guide bar 44 to its outermost position releasing the brake.

The brake pedal actuator is initially set-up by resting the plate 24 against the seat of the vehicle and locking the pad 40 against the steering column or other rigid member of the vehicle above the floor. There is thus provided a solid three-point support system for the actuator. Then the clamp C is positioned over the pedal P with the angle of the bar 44 set by adjustment of the bar 48 to provide a substantially right angle between the brake pedal and the guide bar 44. Quick adjustment can be made by the locking mechanism 64 to allow the guide bar to be quickly positioned relative to the brake pedal. Preferably the brake pedal is depressed slightly initially to provide a minimum of free play in the pedal. Energization of the vacuum cylinder 66 will thus further move the guide bar towards the pedal against the force of the spring 78, depressing the pedal to actuate the brakes on the vehicle.

The system employed to energize the vacuum cylinder, which can be an electrically actuated cylinder, as well, is preferably a pneumatic system as illustrated in FIG. 4. In this system the towing vehicle is provided with a reservoir 82 which is the case of a tow truck is usually supplementary to a main vacuum reservoir 80. If the towing vehicle is not provided with a vacuum system, a reservoir can be placed on the seat of the vehicle and a hose coupled between the reservoir and the vacuum line of the engine. Thus the system is applicable not only to towing trucks which have extensive vacuum boosting equipment, but also to conventional passenger vehicles having only a vacuum line on the engine. A vacuum hose 84 is coupled to the reservoir and to a power assist unit, such as a Bendix Hydrovac power boast, on the towed vehicle 86 if one is provided. If the towed vehicle does not have power assisted brakes, the hose 84 is capped and not employed. A second line 88 passes from the reservoir 82 to a manually operated control valve 89 on the towing vehicle. A third line 90 passes between the control valve to the vacuum cylinder 66. The hoses 84 and 90 each employ quick disconnect couplers so that they may be readily installed or removed. With the engine of the towing vehicle in operation or through the use of a pre-pressurized reservoir 82, it can be readily seen that the control of the brakes of the towed vehicles is thus provided by the control member 89.

While the preferred embodiments of the invention have been illustrated and described, it should be understood that variations will be apparent to one skilled in the art without departing from the principles of the invention. For example, rather than using a vacuum a pressurized pneumatic system can be employed since the vacuum cylinder 66 conventionally have either a vacuum or an air pressure inlet. Furthermore, if a pressurized system cylinder is employed, a pre-pressurized air bottle can be coupled to the cylinder 66 with the trigger of the air bottle coupled to the towing vehicle. In this manner if the towed vehicle breaks away from the towing vehicle the air bottle will automatically release its contents and energize the cylinder 66 to bring the towed vehicle to a stop.

I claim:

1. A remotely controlled brake system operating between towed and towing vehicles in which the towed vehicle has a floor, a seat, a rigid support above the floor and a pedal-type foot brake operating mechanism comprising brake actuator means in the towed vehicle; means removably coupling said brake actuator means to the foot brake operating mechanism of the towed vehicle for depressing the pedal along a path, said actuator means including powered means for moving the brake pedal, first brace means for supporting the powered means on the floor, second brace means for supporting the powered means from the seat of the towed vehicle, and third brace means for supporting said powered means from the rigid support; and control means coupled to said powered means for controlling the operation of said brake pedal, said coupling means including a clamp having an abutment surface for engaging the brake pedal and an opposed clamping surface adjustably connected with said abutment surface for clamping the pedal therebetween, said actuator means including a guide bar coupled to said clamp in generally axial alignment with said pedal depressing path and having means for quickly adjusting the distance between the pedal and the powered means for initially pressing the abutment surface against the pedal, and a lever arm pivoted to said second brace and to said guide bar for movement generally along said path for depressing the pedal upon energization of the powered means.

2. The brake system of claim 1, said powered means being pneumatically operated and including a pneumatic coupling said supply with said control means and said control means with said powered means.

3. The brake system of claim 1, said third brace means including a length adjustable ram coupled at one end to said first brace means for pressing said first brace means against the floor.

4. The brake system of claim 2 wherein the towed vehicle has a brake power-assist and including a third quick-disconnect line from said supply to said brake power-assist.

5. The brake system of claim 1, said third brace means including a vertical bar, a ram telescopically fitted over said vertical bar, said ram having an upper abutment surface engageable with said rigid support, and quick-disengage locking means interconnecting said ram and said vertical bar for adjusting the distance between said upper abutment surface and said first brace means, said means for adjusting the distance between said pedal and said powdered means including a clamp sleeve telescopically mounted on said guide bar and a quick-disengage releasable lock clamping the clamp sleeve to the guide bar, with said lever arm being pivotally mounted on said clamp sleeve.

6. The brake system of claim 1, including a universal coupler connecting said clamp abutment surface with said guide bar, and a vertically adjustable guide sleeve positioned on said second brace means for aligning said guide bar in generally axial alignment with said pedal depressing path, said universal coupler including a lower end threadably joined to said opposed clamping surface and rotatably joined to said abutment surface, and handle means on said guide bar for rotating the guide bar to vary the space between said abutment and clamping surfaces for clamping on said pedal.

7. The brake system of claim 6, said third brace means including a substantially vertical bar, a ram telescopically fitted over said vertical bar, said ram having an upper abutment surface engageable with said rigid support, and quick-disengage locking means interconnecting said ram and said vertical bar for adjusting the distance between said upper abutment surface and said first brace means, said means for adjusting the distance between said pedal and said powered means including a clamp sleeve telescopically mounted on said guide bar and a quick-disengage releasable lock clamping the clamp sleeve to the guide bar, with said lever arm being pivotally mounted on said clamp sleeve.

* * * * *